W. V. TURNER.
AUTOMATIC TRAIN BRAKE CONTROL APPARATUS.
APPLICATION FILED MAY 13, 1907.
1,129,319.
Patented Feb. 23, 1915.
4 SHEETS—SHEET 1.
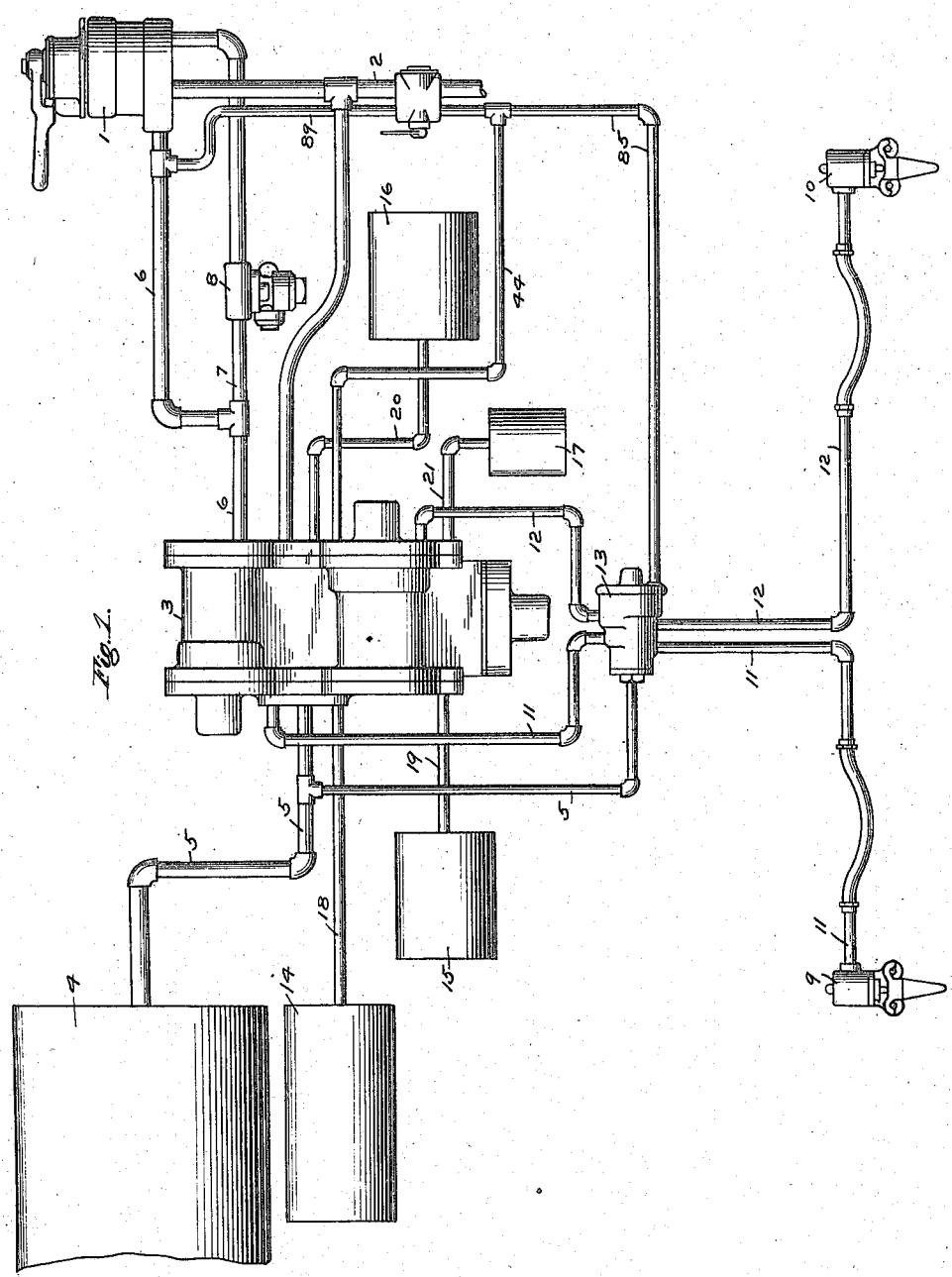
WITNESSES
INVENTOR
Walter V. Turner
by E. H. Wright
Att'y.

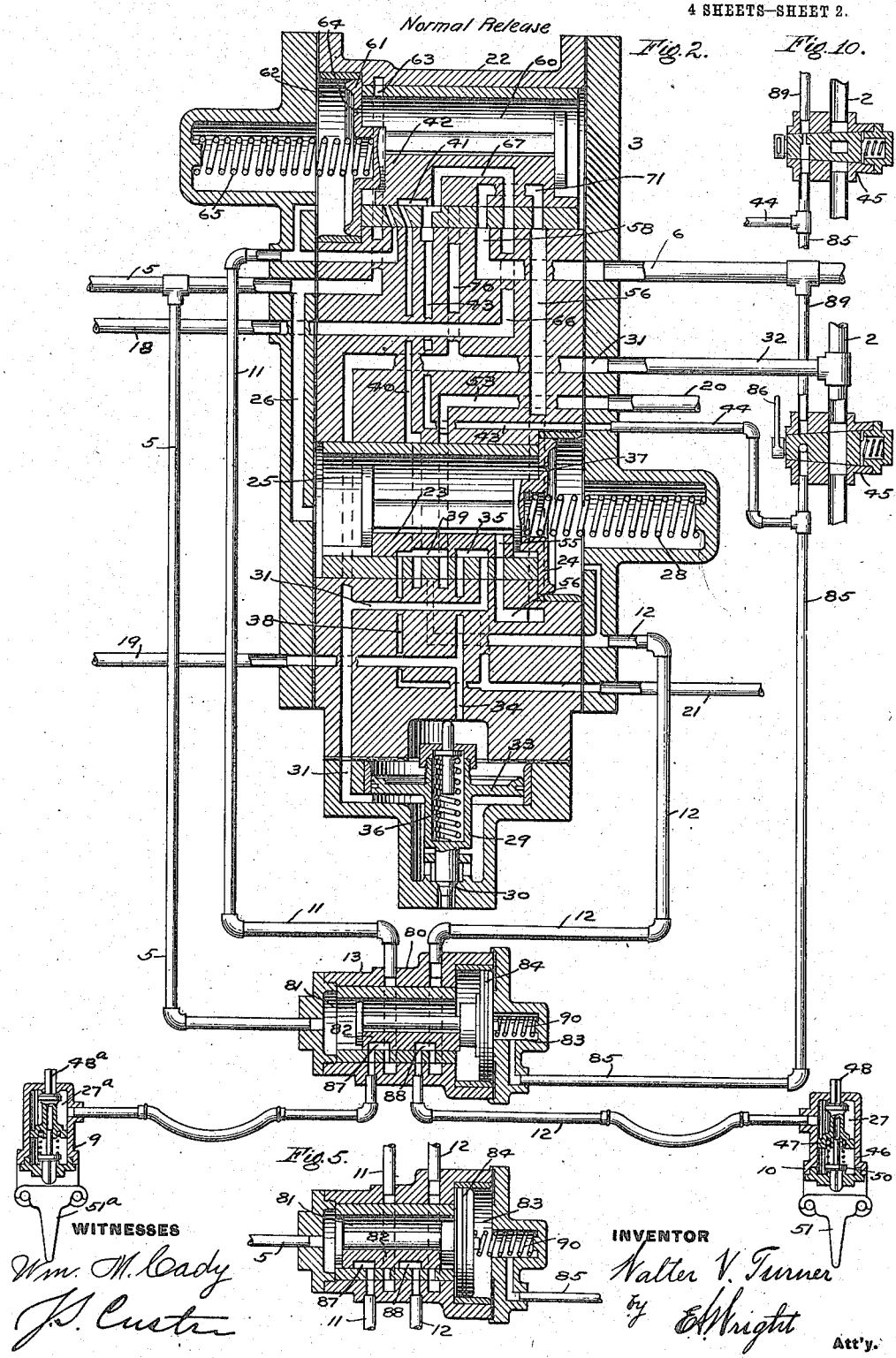

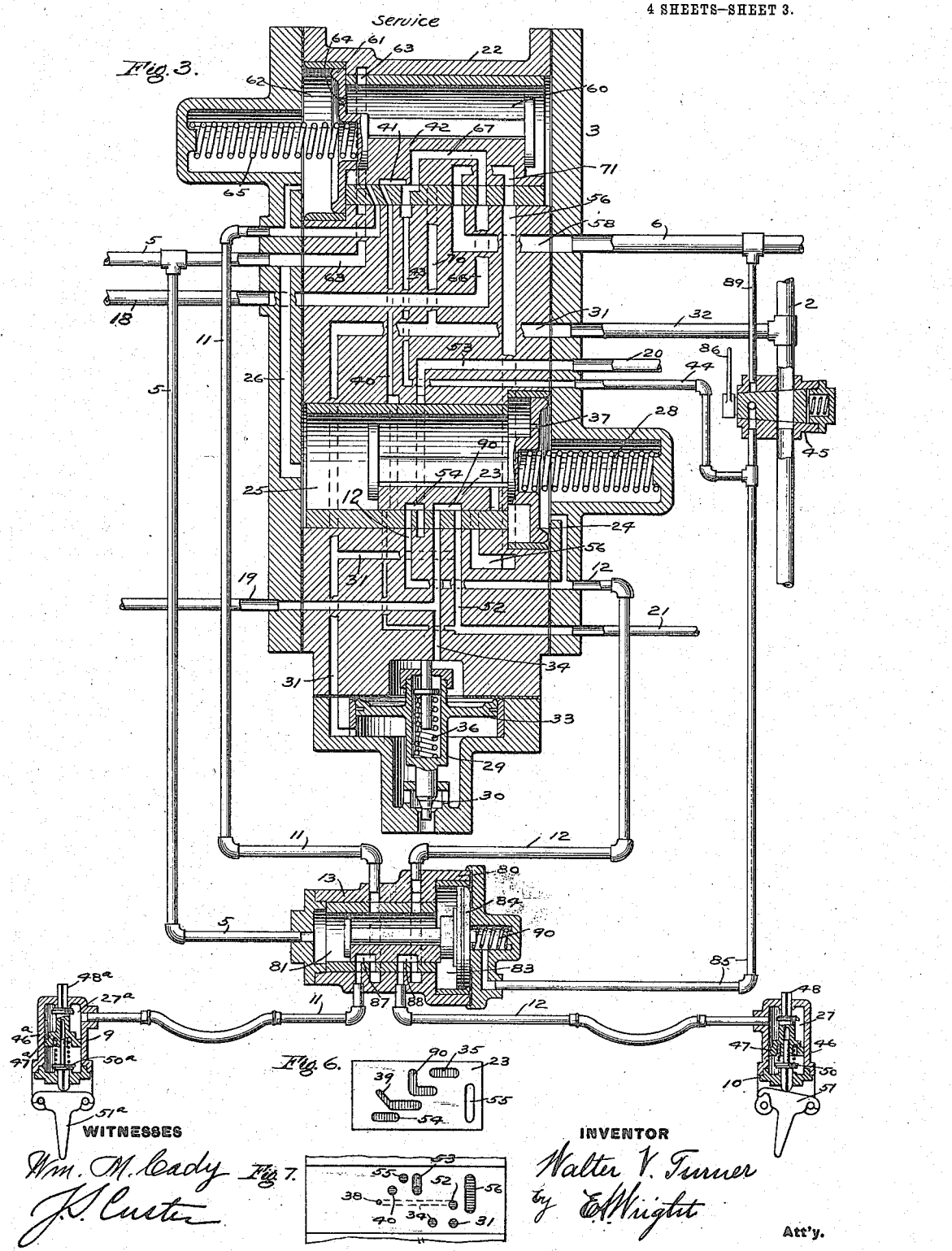

W. V. TURNER.
AUTOMATIC TRAIN BRAKE CONTROL APPARATUS.
APPLICATION FILED MAY 13, 1907.
1,129,319.  Patented Feb. 23, 1915.
4 SHEETS—SHEET 4.
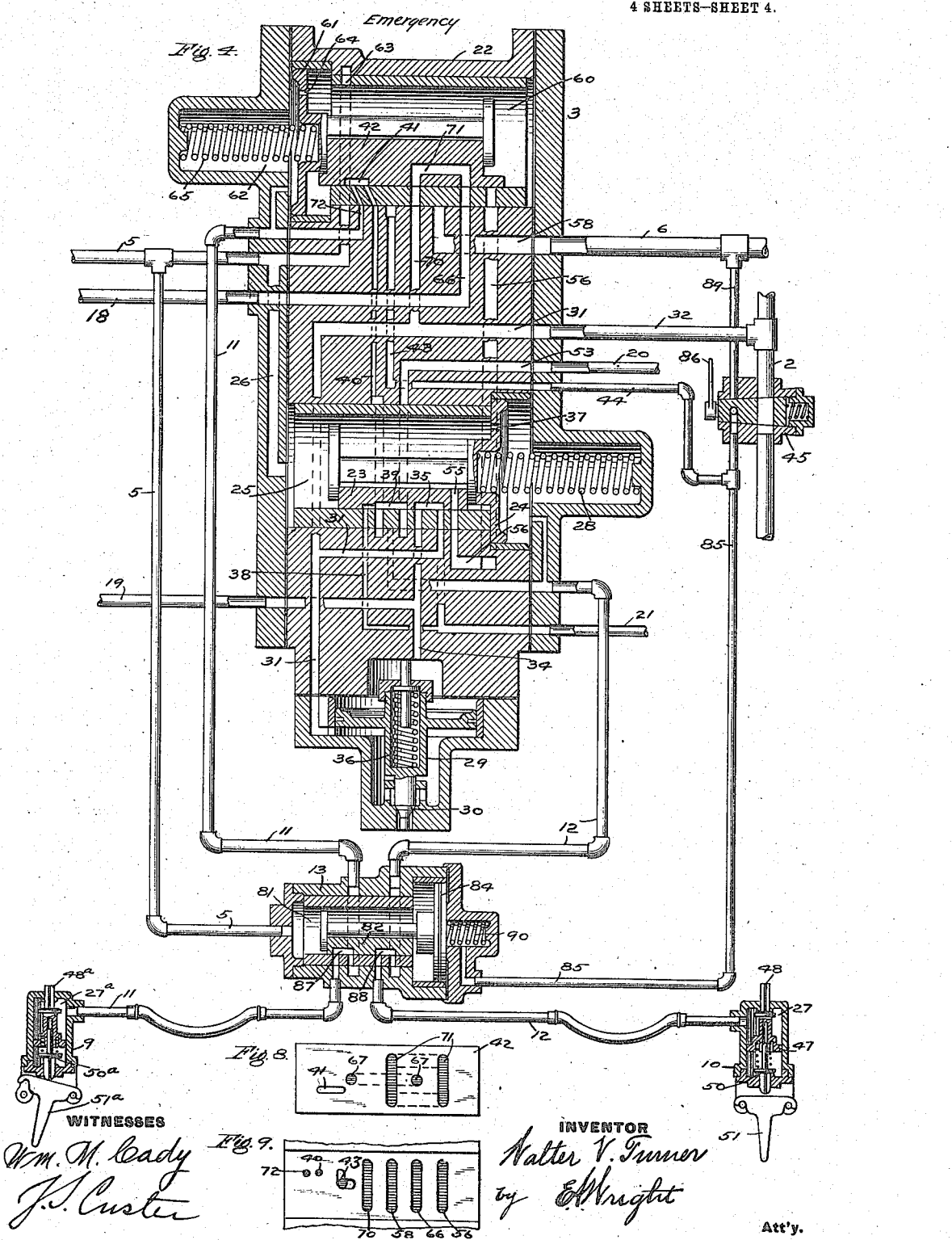

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

AUTOMATIC TRAIN-BRAKE-CONTROL APPARATUS.

1,129,319.        Specification of Letters Patent.     Patented Feb. 23, 1915.

Application filed May 13, 1907. Serial No. 373,243.

*To all whom it may concern:*

Be it known that I, WALTER V. TURNER, a citizen of the United States, residing at Edgewood, in the county of Allegheny and State of Pennsylvania, have invented new and useful Improvements in Automatic Train-Brake-Control Apparatus, of which the following is a specification.

This invention relates to fluid pressure brakes and more particularly to an automatic train brake control apparatus wherein the fluid pressure brakes are automatically applied by the operation of mechanism on the train adapted to be set into action by means located along the track, such as, for example, a so called trip device, such trip devices being commonly operated in conjunction with an automatic block signal system.

The value of the automatic block signal system, as a safety appliance, is dependent largely upon the engineer, to the extent, at least, that he may disregard or may fail to see or properly distinguish the signals, or he may become suddenly incapacitated. It has therefore been proposed to provide means for automatically stopping the train, when a danger condition exists, without attention on the part of the engineer, as by providing a valve for controlling a vent port from the train pipe, the valve being adapted to be opened when engaged by a trip located along the track, so as to effect a sudden reduction in train pipe pressure and thereby produce an emergency application of the brakes. In many cases, it may not be necessary to check the speed of the train with the force and rapidity due to an emergency application of the brakes, although it may be desired to gradually reduce the speed of the train, as by effecting a service application of the brakes.

In view of the above, one object of my invention is to provide an automatic train brake controlling apparatus having means for effecting an emergency application of the brakes at one time, or a service application of the brakes at another time, according to the nature of the danger condition existing.

Another object of my invention is to provide means for automatically releasing the brakes at a predetermined time after an automatic application of the brakes has been effected.

Another object of my invention is to provide means operating when an automatic trip controlled application of the brakes is made to render the release of the brakes impossible by the usual manipulation of the engineer's brake valve to increase the train pipe pressure.

Another object of my invention is to provide manually operated means for cutting out of active operation the trip governed mechanism which is employed to effect an application of the brakes.

With reference to the above mentioned means for cutting out of operation the automatic brake applying means, while it is desirable that the engineer or motorman should at times have the power to cut out such apparatus, as in switching, yard operation, double heading, or the like, it is also important to prevent, as far as possible, any interference with the normal safety operation thereof. In order to accomplish this result, it is a further object of the invention to provide means adapted to delay the actual cutting out of the trip governed mechanism a predetermined time after manual operation, so that it will be practically impossible for the engineer to so time the manual operation as to prevent the normal action of the brake control apparatus on passing a trip device.

Another object is to provide an improved trip mechanism adapted to retard the closing of the vent valve, so that the positive operation of the valve device for effecting an application of the brakes is insured.

The above and other objects and advantages will be noted in the more detailed description hereinafter appearing.

In the accompanying drawings, Figure 1 is a diagrammatic view of a preferred form of apparatus embodying my improvements; Fig. 2 a central sectional view of the automatic train brake control valve mechanism, showing the parts in normal or release position; Fig. 3 a similar view, showing the service valve device in position to effect a service application of the brakes; Fig. 4 a similar view, showing the emergency valve device in position to effect an emergency application of the brakes; Fig. 5 a central sectional view of the cut-out valve device, showing the position of the parts, when the train brake control apparatus is cut out of active operation;

Fig. 6 a face view of the slide valve of the service valve device, showing the ports and cavities; Fig. 7 a plan view of the valve seat therefor; Fig. 8 a face view of the slide valve for the emergency valve device, showing the location of ports and cavities; Fig. 9 a plan view of the slide valve seat therefor, showing the arrangement of ports, and Fig. 10 a central sectional view of the cut out cock, showing the train pipe cut off and an exhaust port to the time mechanism closed.

As shown diagrammatically in Fig. 1, the preferred arrangement of apparatus comprises a brake valve 1, connected to the usual train pipe 2, a brake control valve mechanism 3, main reservoir 4, connected by pipe 5 to the valve mechanism 3 and through ports in said valve mechanism to the brake valve 1, by way of either the direct pipe 6 or pipe 7, containing the usual feed valve 8. Trip governed vent valve devices 9 and 10, are connected by pipes 11 and 12 respectively, to the valve mechanism 3, through a cut out valve device 13. A train pipe pressure reducing reservoir 14, an equalizing reservoir 15, time reservoir 16 and service reducing reservoir 17 are connected by the respective pipes 18, 19, 20 and 21 to said valve mechanism.

According to a preferred form of construction, as shown in the drawings, the automatic train brake control apparatus embodying my invention may comprise a casing 22, containing the valve device for effecting a service application of the brakes, comprising a valve 23 and an actuating piston 24 therefor, subject on one side to fluid pressure in the valve chamber 25, which is in open communication with a source of fluid pressure, such as the main reservoir 4, through a passage 26 communicating with main reservoir pipe 5. The other and outer face of the piston 24 communicates through a pipe and passage 12 with a vent valve chamber 27 of trip controlled device 10. The service valve device controls the operation of an equalizing discharge valve 29, which may also be arranged in the casing and may be similar to the usual equalizing discharge valve in the standard engineer's brake valve, and comprises a discharge valve 30 for controlling the discharge of fluid under-pressure from the train pipe, from passage 31, which is in free open communication with the train pipe, through pipe 32. An actuating abutment 33 for said valve 30, is subject on one face to train pipe pressure, through passage 31, which communicates therewith, and normally, the opposite face is also open to train pipe pressure by way of a passage 34, which is connected to train pipe passage 31 through a cavity 35 in the service valve 23, as shown in Fig. 2. The opposing fluid pressures on piston 33 being thus balanced, the discharge valve 30 is normally held closed by a spring 36. The service valve piston 24 has an equalizing port 37, so that normally the opposing pressures thereon are balanced and a spring 28 tends to maintain the same in its inner normal position. An equalizing reservoir 15 is in open communication through pipe 19 with the upper face of the equalizing discharge valve piston 33. In order to effect a gradual reduction in train pipe pressure of a predetermined amount, I provide a reducing reservoir 17, which is normally open to the atmosphere, through a communication, controlled by the service valve 23, and such communication may open directly to the atmosphere, but for reasons to appear hereinafter, I prefer to arrange the passages as shown in the drawings, wherein the reducing reservoir pipe 21 is open to a passage 38, which, in the normal position of the parts, is connected by a cavity 39 in the service slide valve 23, to a passage 40, open through a cavity 41 in the emergency slide valve 42, to a passage 43, leading to a pipe 44, which is open to an exhaust port. Preferably this exhaust port is located in a cut out cock 45, so that the same may be manually controlled. Normally, fluid under pressure flows from the main reservoir through pipe 5 and passes 26 to the service valve chamber 25 and equalizes through the equalizing port 37, so that the spring 28 maintains the valve 23 and piston 24 in their inner position, the equalizing reservoir 15 and the opposite sides of the discharge valve piston are charged to the normal standard pressure through the train pipe passage 31, and the reducing reservoir 17 is maintained at atmospheric pressure as before described.

The movement of the valve device for effecting a service application of the brakes, may be governed by any suitable trip mechanism, but preferably I employ an improved device of this character, as shown in the drawings, comprising a casing 46, containing a movable abutment 47 adapted to actuate a vent valve 48, for venting fluid from pipe 12 and the service piston 24. The abutment 47 is normally subject on its opposite faces to fluid pressure, as fluid from the pipe 12 equalizes around said abutment to the opposite side of same, and the abutment is operated by venting air from one side thereof, as by opening a spring pressed valve 50, adapted to be actuated by a suitable trip arm 51, which in turn is adapted to be operated by the usual trip device, arranged along the track. When the trip arm 51 is struck, the valve 50 is opened, venting air from the under side of the abutment 47, and the vent valve 48 is thus opened by the movement of the abutment 47 to suddenly release fluid from the outer face of the service piston 24. It should be noted that the vent valve 48 does not immediately close, but remains open until the fluid pressures equalize on opposite sides of the abutment, after the closing of the valve 50. This insures that a sufficient venting of air from the piston 24 takes place, to positively shift the same to its outer position. In this outer position of the piston 24, as shown in Fig. 3, the train pipe communication to the upper face of the equalizing piston and to the equalizing reservoir is cut off, and communication is established from passage 34 and the equalizing reservoir pipe 19, through cavity 90 in the valve 23, to passage 52, which leads to the reducing reservoir pipe 21. Communication is also closed between the reducing reservoir passage 38 and the exhaust passage 40. Fluid pressure in the equalizing reservoir and on the discharge piston 33 is thereupon reduced by equalization into the reducing reservoir 17 and the higher train pipe pressure on the opposite face of the discharge valve piston lifts the same and opens the discharge valve 30, thereby venting air from the train pipe until the train pipe pressure has reduced to a degree substantially equal to the pressure of fluid on the equalizing reservoir side of the piston when the piston operates to close the valve 30. The train pipe pressure is thus reduced a predetermined and definite amount, and a service application of the brakes is then effected by the usual automatic brake equipment in the well known way.

According to another feature of my invention, the brakes may be held applied for a predetermined period of time and then released, and for this purpose, I provide a time reservoir 16, which is normally at atmospheric pressure, being connected through the pipe 20 and a passage 53 to the exhaust passage 40 by the cavity 39 in the service valve 23, when the latter is in normal release position. This communication is cut off by movement of the piston 24 to the application position, and the time reservoir is then connected to pipe and passage 12 and the outer face of the piston 24 by cavity 54 in the service slide valve 23. The volume open to the outer face of the service piston 24, may thus be made such, that any desired interval of time will elapse before the opposing pressures on the piston 24 have sufficiently equalized through the equalizing port, to permit the piston to be returned to normal release position by the spring 28. In order to effect the release of the brakes, when the piston returns to its inner position, I provide means whereby the train pipe pressure may be then increased, and for this purpose a communication may be established by the valve 23 from a source of fluid pressure directly to the train pipe, or said valve may control communication from the brake valve to the train pipe, but, as shown in the drawings, the main reservoir is preferably connected to the brake valve as follows: from main reservoir pipe 5, through passage 26, valve chamber 25, through port 55, in the service valve 23, which registers with a passage 56 in normal release position, through cross over cavity 71 in the emergency slide valve, to passage 58, which opens into the pipe 6, leading to the brake valve. In the service application position, the brake valve reservoir communication is closed by movement of the service valve 23, which closes the passage 56, and, as the air supply is thus cut off, the engineer will be unable to release the brakes at this time. This result is very desirable, as it prevents the engineer from interfering with the normal operation of the trip mechanism and the automatic control of the brakes. Upon the return of piston 24 to normal release position after a predetermined time, as hereinbefore described, communication is again established from the reservoir 4 to the brake valve, as passage 56 registers with port 55, and air flows from the reservoir, through the valve mechanism, to pipe 6 and feed valve pipe 7, recharging the train pipe in the usual way and releasing the brakes.

My invention further consists of means, which may be similar to the service valve device already described, for effecting a sudden reduction in train pipe pressure and an emergency application of the brakes. The emergency valve device may be separate, but I prefer to combine it with the service valve device in a single casing for the sake of simplicity and compactness, as shown in the drawings. The emergency valve device therefore comprises a slide valve 42, contained in the valve chamber 60, and an actuating piston 61, contained in piston chamber 62. The piston chamber 62 at the outer face of the piston 61 is open, through a pipe 11, to chamber 27ª of a trip controlled mechanism 9, which may be similar to the trip mechanism 10 for the service valve device. The valve chamber 60 is in free open communication with the main reservoir 4, through the pipe 5, which connects with a passage 63, opening into said valve chamber. The fluid pressures are normally equalized on the opposite faces of the piston through an equalizing port 64, and a spring 65 tends to maintain the piston 61 and slide valve 42 in their inner position. In this inner normal position, as before described, cavity 71 establishes communication between the main reservoir 4 and the brake valve 1. The emergency valve device may control a direct vent port from the train pipe to the atmosphere for effecting a sudden reduction in train pipe pressure, but I prefer to provide a train pipe reduction reservoir 14, connected by pipe 18 to passage 66, which normally communicates through cavity 67 in slide valve 42 with passage 43 and pipe 44 leading to an exhaust port, so that normally said train pipe reducing reservoir is at atmospheric pressure. Air being vented from the outer face of the emergency piston 61, upon operation of the emergency trip valve, the piston 61 moves to its outer position, as shown in Fig. 4, in which the emergency valve 42 establishes communication from the train pipe to the train pipe reducing reservoir 14, by way of pipe 32, passage 31, passage 70, cavity 71 in the emergency slide valve 42, passage 66 and pipe 18 to the reducing reservoir 14. A sudden reduction in train pipe pressure is thus obtained, which produces an emergency application of the brakes. The emergency valve device may be held in this position by a time mechanism such as applied to the service valve device and for this purpose, the cavity 41 connects a passage 72, which is in communication with the pipe 11 and piston chamber 62, with passage 40, which is in open communication with the time reservoir 16 and the reducing reservoir 17, through cavity 39, in the service slide valve 23, passage 53 and pipe 20, the reducing reservoir being connected thereto by way of the passage 38. As a consequence of this construction, the fluid under pressure, flowing through the equalizing port 64 in the emergency piston 61, must raise the pressure in the time reservoir and the reducing reservoir to substantially that on the opposite or inner face of the piston, before the spring 65 can move the piston back to its inner posion, so that, as in the case of the time device as described in connection with the service valve device, a certain period of time elapses before the emergency piston 61 returns to its normal position. It will also be noted that in the emergency action of the apparatus, the time reservoir volume is larger than in service, so that the parts are held in the emergency position for a correspondingly longer period of time. When the emergency valve returns to the normal position, communication is again established from the main reservoir pipe 5 and the supply pipe 6 to the brake valve, as the cavity 71 in said valve registers with passages 56 and 58, and air from the main reservoir flowing through the brake valve to the train pipe in the usual way, increases the train pipe pressure and releases the brakes.

Another feature of my invention comprises manually actuated means adapted to cut out the automatic brake control apparatus from active operation. As shown in the drawings, the cut out valve device 13 may combine in a single structure, the cut out means for both the service and emergency valve mechanisms, and comprises a casing 80 having a valve chamber 81, containing slide valve 82, and piston chamber 83, containing operating piston 84. The valve chamber 81 and the inner face of the piston 84 is in free open communication with a source of fluid pressure, as the main reservoir, through pipe 5, and the outer face thereof and piston chamber 83 are connected by a pipe 85 to a manually controlled cock adapted in one position, to open said pipe 85 to the atmosphere, and in another position, to connect the pipe to a source of fluid pressure. As a preferred arrangement, I connect the pipe 85 to the exhaust of the pipe 44, which leads to the reducing and time reservoirs, so that on movement of the cock handle 86, the exhaust from said reservoirs, as well as the exhaust from the cut out device, is controlled. In operation, the pipe 85 is normally open to the atmosphere, so that the reservoir pressure in valve chamber 81 normally maintains the piston 84 and valve 82 at their outer position, in which cavities 87 and 88 establish communication respectively through pipes 11 and 12 from the trip valves 48$^a$ and 48 to the emergency and service valve devices. The engineer may cut off communication through the pipes 11 and 12 by turning the cock handle 86 so as to close the exhaust and open a communication from a source of supply, as from the main reservoir supply pipe 6 to a pipe 89 connected to the cock, as shown in Fig. 10, but in order to prevent the engineer from cutting out the apparatus in the normal and usual operation of the train brake control apparatus, I provide a time mechanism adapted to delay the movement of the cut out valve device a predetermined time after operation of the manually actuated means for controlling the movement of said cut out valve device. For this purpose, I connect to the pipe 85, leading to the outer face of the piston 84, a reservoir normally at atmospheric pressure. In the present instance, I preferably employ the reservoirs already mentioned, which are normally at atmospheric pressure, namely, the service reduction reservoir 17, the train pipe reduction reservoir 14 and the time reservoir 16, which are all connected to the exhaust outlet pipe 44. When the engineer desires to cut out the brake control valve device, he turns the cock handle 86 so that the supply pipe 89 is open to the pipe 85, thereupon air flows into the pipe 85 and through the pipe 44 to the various reservoirs heretofore mentioned, and as the inner face of the piston 84 is subject to main reservoir pressure, it is evident that the pressure must be raised, in all that volume open to the pipe 85, substantially to main reservoir pressure, before the spring 90 will shift the cut out piston to close communication through the pipes 11 and 12. The time thus required, before the cut out valve operates, will not be of consequence in actual cases of necessity for cutting out, as in double heading, yard switching and the like, but it is obvious, that it will be practically impossible for the engineer to cut out the valve device at just the right time, so as to avoid the active operation of the brake control mechanism. The manually operated cock for governing the cut out valve device I preferably combine with the usual double heading cut out cock, as shown in the drawings, thereby obviating the necessity for an additional cock handle.

The brake control mechanism has been described as located so as to control communication between the main reservoir and the brake valve, but it is obvious that said valve mechanism may be placed in other locations adapted to control the supply of fluid pressure to the train pipe, as, for example, between the brake valve and the train pipe. It will also be understood that the service and emergency trip mechanisms may be placed on opposite sides of the train or at different elevations, or in various other ways, so long as they are selectively arranged with respect to the track trips, further, it is obvious, that other means for operating the valve mechanism may be employed, as, for example, electric contacts on the track, adapted to effect the operation of electric mechanism on the train, for causing the operation of the brake control apparatus.

My invention is especially adapted for use in connection with the well known automatic block signal system, wherein a home signal displayed, indicates that the train should be brought to a stop, and a distant signal, that the train may proceed, but at a reduced speed. With my invention, the trip actuated for the displayed distant signal, will operate the trip valve of the service valve mechanism and produce a service application of the brakes, and after a predetermined period of time, the speed of the train having been reduced, the brakes are automatically released, similarly, the emergency trip mechanism is actuated by the trip for a displayed home signal, to effect an emergency application of the brakes and bring the train to a stop, the brakes being automatically released after a predetermined time, as in the case of a service application. In neither case can the engineer prevent the operation of the brake control apparatus, nor can he release the brakes immediately after an application, or until the time mechanism has effected its purpose.

Having now described my invention, what I claim as new and desire to secure by Letters Patent is:

1. An automatic train brake control apparatus comprising a brake valve, a train pipe, a chamber normally at atmospheric pressure, a valve mechanism for opening and maintaining communication from the train pipe to said chamber to effect a predetermined reduction in train pipe pressure corresponding with the degree of pressure at which the train pipe equalizes into said chamber and an automatically operating valve device for effecting the operation of said valve mechanism independently of the brake valve.

2. An automatic train brake control apparatus comprising a train pipe, a valve mechanism for effecting a reduction in train pipe pressure, a piston for actuating said valve mechanism, means for maintaining said piston and valve means in the position for effecting a reduction in train pipe pressure during a predetermined period of time, and means for effecting the operation of said piston.

3. An automatic train brake control apparatus comprising a brake valve, a valve device, means for reducing the pressure on said valve device to effect a reduction in train pipe pressure and produce an application of the brakes, and means for limiting the reduction in pressure on said valve device.

4. An automatic train brake control apparatus comprising a brake valve, a valve and actuating abutment, and means for varying the pressure on one side of said abutment any desired predetermined amount to actuate said valve and open a vent port to the train pipe, for producing an application of the brakes corresponding with the particular variation in pressure effected.

5. An automatic train brake control apparatus comprising a train pipe vent valve and actuating piston normally subject to train pipe pressure on its opposite faces, a valve mechanism for venting one side of said piston to a vent chamber to actuate said valve and effect a gradual reduction in train pipe pressure for producing a service application of the brakes, and means operated automatically for reducing the pressure on said valve mechanism to operate the same.

6. An automatic train brake control apparatus comprising a train pipe vent valve and actuating piston, subject to the opposing pressures of the train pipe and an equalizing reservoir, normally at train pipe pressure, a valve mechanism for venting said equalizing reservoir to a reduction reservoir to actuate said valve, and means for automatically venting fluid from one side of said valve mechanism to operate the same.

7. An automatic train brake control apparatus comprising a train pipe vent valve and actuating piston subject to the opposing pressures of the train pipe and an equalizing reservoir normally at train pipe pressure, a spring device tending to seat said valve, and a valve mechanism for venting said equalizing reservoir to a reduction reservoir to actuate said valve and thereby effect a gradual reduction in train pipe pressure.

8. In an automatic train brake control apparatus, the combination with a train pipe and a valve mechanism operated by a reduction in fluid pressure on one side for effecting a reduction in train pipe pressure and adapted upon equalization of fluid pressures on opposite sides to open communication for restoring the train pipe pressure.

9. In an automatic train brake control apparatus, the combination with a train pipe, reservoir, and a valve mechanism operated by venting fluid from one side for effecting a reduction in train pipe pressure and adapted to open communication for restoring the train pipe pressure upon equalization of the fluid pressure on one side of said valve mechanism into said reservoir.

10. In an automatic train brake control apparatus, the combination with a train pipe, reservoir, a valve mechanism operated by a reduction in pressure on one side for effecting a reduction in train pipe pressure, and means for holding the valve mechanism in the position for reducing the train pipe pressure until the fluid pressure on the opposite side of said valve mechanism has equalized into said reservoir.

11. An automatic train brake control apparatus comprising a valve device normally subject to opposing fluid pressures and adapted to effect a reduction in train pipe pressure in one position, and an increase in train pipe pressure in another position, means adapted to vary the fluid pressure on one side of said valve device and shift the same to said train pipe reduction position, and means adapted on equalization of pressures thereon to move said valve device to its train pipe pressure increase position.

12. An automatic train brake control apparatus, comprising a piston normally subject to opposing fluid pressures, a valve controlled thereby and normally establishing communication between a source of fluid pressure and the train pipe, mechanism for varying the fluid pressure on one side of said piston, to move said valve and piston to a position for effecting a reduction in train pipe pressure to produce an application of the brakes, and in which communication is open from one side of said piston to a time reservoir, and means for returning said valve and piston to normal position on equalization of pressures on said piston.

13. In an automatic train brake control apparatus, the combination with a reservoir, train pipe, and brake valve, of a valve and piston subject to opposing fluid pressures for normally establishing communication from the reservoir to the brake valve, means for varying the pressure on one side of said piston to actuate said valve to effect a reduction in train pipe pressure and thereby produce an application of the brakes and cut off said reservoir communication.

14. In an automatic train brake control apparatus, the combination with a reservoir, train pipe, and brake valve, of a valve and piston subject to opposing fluid pressures for normally establishing communication from the reservoir to train pipe, through the brake valve, means for varying the pressure on one side of said piston to actuate said valve to effect a reduction in train pipe pressure and thereby produce an application of the brakes and cut off said reservoir communication, and means for returning said valve and piston to normal position, upon equalization of pressures thereon, to thereby open said reservoir communication to effect an increase in train pipe pressure and thereby release the brakes.

15. An automatic train brake control apparatus comprising a train pipe, a brake valve, a reservoir from which fluid is supplied to the train pipe by operation of the brake valve, and a valve mechanism for controlling communication from the reservoir to the brake valve and for effecting a reduction in train pipe pressure independently of the position of the brake valve.

16. An automatic train brake control apparatus, comprising a valve mechanism operated by fluid pressure for effecting an application of the brakes, a valve for varying the fluid pressure on said valve mechanism, a cut out valve device normally maintaining communication therebetween, and manually operated means for varying the fluid pressure on said cut out valve device to thereby close said communication.

17. An automatic train brake control apparatus, comprising a valve mechanism for effecting a reduction in train pipe pressure, means adapted to cut said valve mechanism out of active operation, manual means for operating said cut out means, and time mechanism for delaying the action of said cut out means.

18. An automatic train brake control apparatus, comprising a valve mechanism for effecting a reduction in train pipe pressure, a valve device adapted to cut said valve mechanism out of active operation, manual means for varying the fluid pressure on, and for effectively connecting said valve device to a time reservoir, thereby delaying the action of said cut out valve device.

19. An automatic train brake control apparatus comprising a fluid pressure operated valve device adapted to effect an application of the brakes, means for varying the fluid pressure on said valve device, cut out means subject to the opposing pressures of a spring and a fluid for controlling communication therebetween, and manually operated means for connecting said spring side of the cut out means to a source of fluid pressure and to a chamber, to thereby shift said cut out means to close said communication between the application valve device and said means for varying the fluid pressure on said valve device.

20. An automatic train brake control apparatus, comprising a valve device operated upon a reduction in fluid pressure to effect a reduction in train pipe pressure, of valve means for venting air from said valve device, and means for retarding the closing movement of said valve means.

21. In an automatic train brake control apparatus, the combination with a valve device adapted to effect a predetermined reduction in train pipe pressure and a service application of the brakes, of a valve device adapted to effect a sudden reduction in train pipe pressure and an emergency application of the brakes, and means for actuating said valve devices.

22. In an automatic train brake control apparatus, the combination with a valve device comprising a piston and valve adapted to effect a gradual reduction in train pipe pressure, of another valve device comprising a piston and valve adapted to effect a sudden reduction in train pipe pressure and means for actuating each valve device.

23. An automatic train brake control apparatus comprising a valve mechanism for effecting both service and emergency applications of the brakes, and means for automatically releasing the brakes after one period of time when a service application of the brakes is made and after a different period of time when an emergency application of the brakes is effected.

In testimony whereof I have hereunto set my hand.

WALTER V. TURNER.

Witnesses:
R. F. EMERY,
WM. M. CADY.